United States Patent [19]

Wentorf, Jr. et al.

[11] 4,287,168

[45] Sep. 1, 1981

[54] APPARATUS AND METHOD FOR ISOLATION OF DIAMOND SEEDS FOR GROWING DIAMONDS

[75] Inventors: Robert H. Wentorf, Jr., Schenectady; William A. Rocco, Scotia, both of N.Y.

[73] Assignee: General Electric Company, Worthington, Ohio

[21] Appl. No.: 744,169

[22] Filed: Nov. 22, 1976

Related U.S. Application Data

[63] Continuation of Ser. No. 544,497, Jan. 27, 1975, abandoned, which is a continuation of Ser. No. 412,331, Nov. 2, 1973, abandoned.

[51] Int. Cl.³ .............................................. C01B 31/06
[52] U.S. Cl. ................................... 423/446; 206/525; 422/129; 422/240; 425/77
[58] Field of Search ............. 423/446; 23/252 R, 289, 23/273 R, 273 SP; 425/77; 206/525, 219, 524.1; 63/32; 106/42; 422/129, 240

[56] References Cited

U.S. PATENT DOCUMENTS

| 3,297,407 | 1/1967 | Wentorf ................................ 423/446 |
| 3,303,053 | 2/1967 | Strong et al. .................... 423/446 X |
| 3,317,035 | 5/1967 | Cannon ............................ 423/446 X |
| 3,346,102 | 10/1967 | Strong ............................... 423/446 X |
| 3,423,177 | 1/1969 | Bovenkerk ........................... 423/446 |

OTHER PUBLICATIONS

Armagnac, "Popular Science", vol. 197, No. 3, 1970, pp. 82, 83, 134 & 137.

Primary Examiner—Edward J. Meros
Attorney, Agent, or Firm—Morgan, Finnegan, Pine, Foley & Lee

[57] ABSTRACT

Reaction vessel construction is provided whereby in the practice of the invention disclosed in U.S. Pat. No. 3,297,407 - Wentorf, Jr. diamond seed material is isolated from the main supply of catalyst-solvent metal by an inert barrier insoluble in the catalyst-solvent bath. One or more restricted diamond growth paths (e.g. small diameter wires of catalyst-solvent) are provided through the inert barrier interconnecting diamond seed material and the main supply of catalyst-solvent metal. In this way the diamond seed material cannot be eroded or destroyed by exposure to the bath of catalyst-solvent metal and a controllable limit can be placed on the size of the single diamond seed crystal ultimately presented to the bath via any given growth path.

18 Claims, 4 Drawing Figures

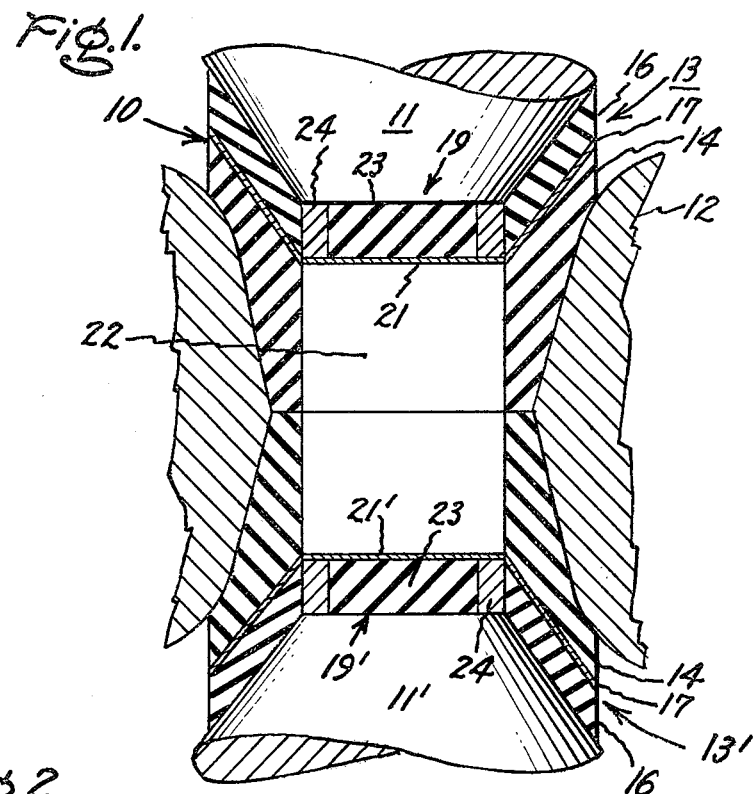
Fig. 1.
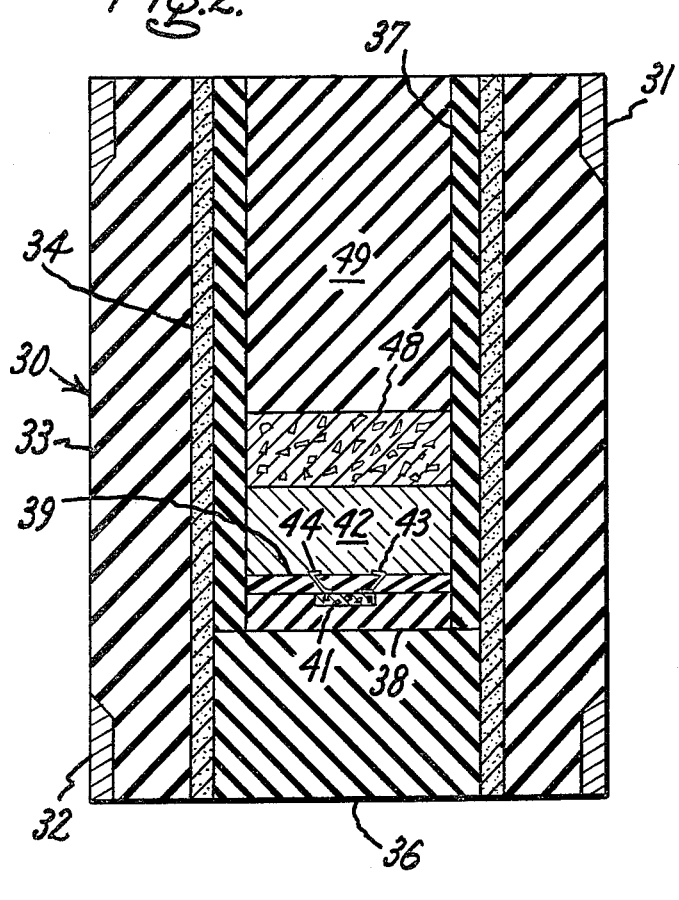
Fig. 2.
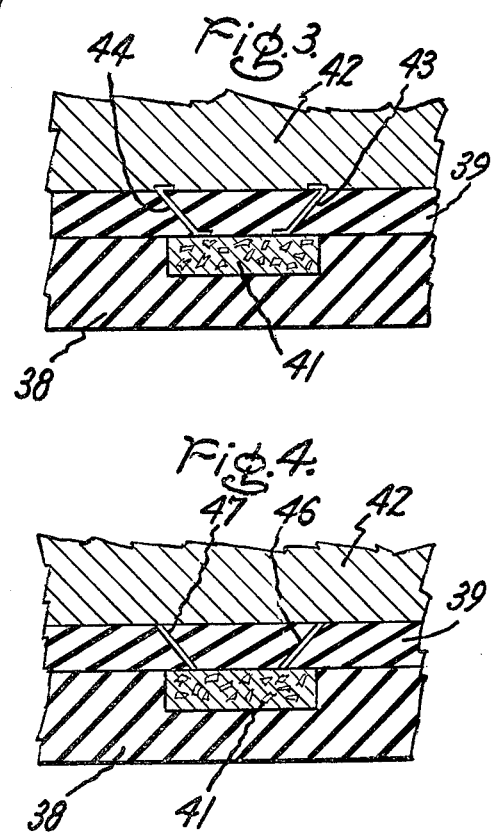
Fig. 3.
Fig. 4.

APPARATUS AND METHOD FOR ISOLATION OF
DIAMOND SEEDS FOR GROWING DIAMONDS

This is a continuation of application Ser. No. 544,497, filed Jan. 27, 1975, now abandoned, which is a continuation of Ser. No. 412,331, filed Nov. 2, 1973, now abandoned.

BACKGROUND OF THE INVENTION

The synthesis of diamond crystals by high pressure, high temperature processes has become well established commercially. Preferred methods for making diamonds are disclosed and claimed in U.S. Pat. Nos. 2,947,610—Hall et al and 2,947,609—Strong. Apparatus for the conduct of such processes is described and claimed in U.S. Pat. No. 2,941,248—Hall. The Hall et al, Strong and Hall patents are incorporated by reference.

Diamond growth in the aforementioned processes occurs by the diffusion of carbon through a thin metallic film of any of a series of specific catalyst-solvent materials. Although such processes are very successfully employed for the commercial production of industrial diamond, the ultimate crystal size of such diamond growth is limited by the fact that the carbon flux across the catalyst film is established by the solubility difference between graphite (the typical starting material) and the diamond being formed. This solubility difference is generally susceptible to significant decrease over any extended period due to a decrease in pressure in the system and/or poisoning effects in the graphite being converted.

On the other hand, in the method of growing diamond on a diamond seed crystal disclosed in U.S. Pat. No. 3,297,407—Wentorf, Jr. (incorporated by reference) a difference in temperature between the diamond seed and the source of carbon is relied upon to establish a concentration gradient in carbon for deposition on the seed. Catalyst-solvents disclosed in the aforementioned Hall et al and Strong patents are used in the temperature gradient method as well. The growth of diamond on the seed material is driven by the difference in solubility of diamond in the molten catalyst-solvent metal at the nutrient (source of carbon) and at the seed, between which locations a temperature gradient exists. Most important, this general type of reaction vessel configuration presents a pressure stable system so that pressure can more readily be kept in the diamond stable region.

By very carefully adjusting pressure and temperature and utilizing relatively small temperature gradients with extended (relative to growth times for thin film method) growth times, larger diamonds can be produced by the method as taught in the Wentorf patent than by the thin-film method. However, two conflicting factors appear to be present in this growth of diamonds from seeds. Better new diamond growth results by the use of very small diamond seeds (microscopic size seeds are best), but small seeds are very likely to dissolve in the melted catalyst-solvent metal during that part of the process in which the catalyst-solvent medium melts and then becomes saturated with carbon from the nutrient source. Larger seeds although less likely to be completely dissolved present the problem of uncoordinated diamond growth proceeding from spaced loci on the same seed. When such growths meet, the result is confused, flaw-filled growth.

Therefore, it is important for the broadened application of the Wentorf invention to provide means for simultaneously preventing diamond seed dissolution and enabling presentation to the molten catalyst-solvent bath of a discrete very small diamond seed face to initiate new diamond growth.

SUMMARY OF THE INVENTION

The instant invention provides an improved reaction vessel construction for the practice of the invention disclosed in U.S. Pat. No. 3,297,407—Wentorf, Jr. The improved construction isolates the diamond seed material from the main supply of catalyst-solvent material providing at least one restricted diamond growth path extending through an inert isolation barrier insoluble in the catalyst-solvent bath and located between the diamond seed material and the main body of catalyst-solvent material. Preferably, the diamond growth path(s) is composed of a small diameter wire made of a catalyst-solvent material interconnecting the diamond seed material and the main body of catalyst-solvent material.

Good quality colorless, blue and yellow crystals have been produced using the construction of this invention.

BRIEF DESCRIPTION OF THE DRAWING

This invention will be better understood when considered in connection with the following description of the drawing in which:

FIG. 1 is an elevational view in section of a preferred superpressure apparatus wherein the instant invention may be practiced;

FIG. 2 is an enlarged vertical cross-section of a preferred embodiment of the reaction cell construction of this invention for use in the apparatus of FIG. 1;

FIG. 3 is an even larger scale view of the vicinity of diamond growth paths according to this invention and FIG. 4 is a view similar to FIG. 3 showing diamond growth paths unoccupied by catalyst wires.

DESCRIPTION OF THE PREFERRED EMBODIMENT

One preferred form of a high pressure, high temperature apparatus in which the reaction vessel of the instant invention may be employed is the subject of the aforementioned U.S. Pat. No. 2,941,248—Hall and is schematically illustrated in FIG. 1.

In FIG. 1, apparatus 10 includes a pair of cemented tungsten carbide punches 11 and 11' and an intermediate belt or die member 12 of the same material. Die member 12 defines a centrally-located aperture and in combination with punches 11, 11' defines a pair of annular volumes. Between punch 11 and the die 12 and between punch 11' and the die 12 there are included gasket/insulating assemblies 13, 13', each comprising a pair of thermally insulating and electrically non-conducting pyrophyllite members 14 and 16 and an intermediate metallic gasket 17. The aforementioned assemblies 13, 13' together with end cap assemblies 19, 19' and electrically conductive metal end discs 21, 21' serve to define the volume 22 occupied by reaction vessel 30. Each end cap assembly comprises a pyrophyllite plug, or disc, 23 surrounded by an electrical conducting ring 24.

Reaction vessel 30 (FIG. 2) is of the general type disclosed in U.S. Pat. No. 3,030,662—Strong (incorporated by reference) modified by the addition of steel retaining rings 31 and 32. Hollow cylinder 33 is preferably made of pure sodium chloride, but may be made of other material such as talc.

Broad criteria for the selection of the material for cylinder 33 are that the material (a) not be converted under pressure to a stronger and stiffer state as by phase transformation and/or compaction and (b) be substantially free of volume discontinuities appearing under the application of high temperature and pressures as occurs, for example, with pyrophyllite and porous alumina. The materials meeting the criteria set forth in U.S. Pat. No. 3,030,662 (column 1, line 59 through column 2, line 2) are useful for preparing cylinder 33. Positioned concentrically within and adjacent cylinder 33 is a graphite electrical resistance heater tube 34, which forms an electrical connection with metal end discs 21, 21' when reaction vessel 30 is disposed in volume 22. Within graphite heater tube 34 there is in turn concentrically positioned cylindrical salt liner plug 36 upon which are positioned hollow salt cylinder 37 and its contents.

Operational techniques for applying both high pressures and high temperatures in this apparatus are well known to those skilled in the art. The foregoing description relates to merely one high pressure, high temperature apparatus. Various apparatuses are capable of providing the required pressures and temperatures that may be employed within the scope of this invention. Pressures, temperatures, metallic catalyst-solvents and calibrating techniques are disclosed in the aforementioned patents incorporated by reference.

Salt plug 38 containing a pocket of diamond crystals (or a single diamond, if desired) is disposed within salt sleeve 37 resting upon salt plug 36. Directly thereabove is located the inert barrier disc 39 having at least one fine wire extending through the thickness thereof with the lower end thereof in contact with the pocket 41 of diamond crystals and the upper end thereof in contact with the under surface of the main catalyst-solvent mass 42 to serve as the restricted diamond growth path(s). Inert barrier disc 39 is made of a material insoluble in the molten catalyst-solvent, preferably of sodium chloride. This disc may, however, be made of $CaF_2$ (providing that adjacent reaction vessel components are made of materials compatible therewith); refractory oxides, such as $Al_2O_3$, $MgO$, $ZrO_2$, $CaO$, $SiO_2$, $ThO_2$ and $BeO$, for example; natural mica; high melting point silicate glasses (e.g. borosilicate) not reduced by hot carbon; porcelain or silicates (e.g. $MgSiO_3$ or pyrophyllite fired at 750° C. to drive off water). The thickness of disc 39 should be in the range of from about 0.010" to 0.030".

Wires 43, 44 such as are shown in FIG. 3 or holes 46, 47 as shown in FIG. 4 may extend straight through disc 39, may have a zigzag configuration or may be disposed in other than the perpendicular direction.

Pocket 41 will contain at least one diamond crystal and may contain as much as 30 percent by weight of graphite. It is preferable to have a small concentration of catalyst-solvent metal located in pocket 41 to minimize any erosion of wires, such as wires 43, 44. This metal may be present as a disc disposed between the contents of pocket 41 and the ends of the wires. The amount of catalyst-solvent metal used may range from 10-50% by weight when used.

The diamond growth path(s) are of (or in the case of holes 46, 47 become filled with) some catalyst-solvent metal having a melting point in contact with diamond comparable to the melting point of the catalyst-solvent mass 42 in contact with diamond. Either a single or a plurality of diamond growth paths may be provided depending on the size of the catalyst-solvent bath and the size of diamond growth desired.

The nutrient material 48 may be composed of diamond, diamond plus graphite or may be entirely of graphite, if desired. The graphite occupies any void space between the diamond crystals. It is preferred that the nutrient contain mostly diamond in order to reduce the volume shrinkage that can result during conduct of the process. In conduct of the process any graphite present at operating temperatures and pressures converts to diamond before going into solution in the catalyst-solvent metal. Thus, the pressure loss is minimized so that the overall pressure remains in the diamond-stable region at the operating temperature.

In the embodiment of FIG. 3 wires 43, 44 preferably have a diameter ranging from about 0.001 to 0.020 inch (or equivalent cross-sectional area for non-circular wires) and, when feasible, are molded into plug 38. The upper (hotter) end of the wires 43, 44 must make contact with metallic catalyst-solvent 42 and the cooler end of the wire must touch diamond in pocket 41 (or graphite in pocket 41 which will be turned into diamond).

When operating pressure and temperature are reached the metallic catalyst-solvent 42 in contact with diamond in nutrient layer 48 melts first. The melting proceeds from top down, any graphite in mass 48 of nutrient is converted to diamond and diamond dissolves in the catalyst-solvent. Wires 43, 44 melt and finally carbon-rich molten catalyst-solvent is placed in flow communication with diamond pocket 41 and the carbon begins to come out of the solution as diamond using the surface of diamond in contact with the cooler end of molten "wires" 43, 44 as its "template". The diamond growth proceeds up molten wires 43, 44 to catalyst-metal bath 42, each wire presenting at its upper end discrete single seeding intact for initiating the large crystal growth, which projects into bath 42 as it develops. The size to which the large crystals (not shown) will develop depends upon the volume available in bath 42 for enlargement and the time of the run. If more than one large crystal is being prepared, the length of the run should be terminated before collision occurs between the developing crystals.

In the case of the embodiment of FIG. 4 open-channels 46, 47 are employed in place of wires as in FIG. 3. The operation thereof is substantially the same in that at operating pressures and temperatures (if a strong material such as natural mica is used) the channels remain open sufficient to provide passage of molten catalyst-solvent 42 to diamond pocket 41. This catalyst-solvent so located creates molten "wires" in situ enabling the transport of carbon to the cool end whereby diamond growth can initiate and proceed up through channels 46, 47 to the upper side of disc 39 and thereby provide a single seed for each hole, or channel, provided.

The diamond growth paths (wires 43, 44 or holes 46, 47) survive as long thin strands of diamond, e.g. diamond whiskers. After termination of the run and reduction of temperature and pressure to permit removal of the reaction vessel 30, the new diamond growth embedded in the solidified metallic catalyst-solvent 42 is easily removed by breaking open the mass 42. If desired, the diamond whiskers may be recovered by dissolving salt disc 41.

During decompression the connection is usually broken between the diamond whisker of each growth path and the diamond grown from the seeding provided thereby apparently due to the concentration of stress at this point. Depending upon the cross-sectional area of the growth path, an amount of the new growth is broken out leaving a rough indented face. The smaller the cross-sectional area of the growth path, the shallower the depth of the broken out portion. In the case of gem quality diamonds this damaged face must be ground smooth and minimal damage of this type will provide larger size polished gems. The maximum diameter of 0.020" (or equivalent cross-sectional area) for any growth path enables both the use of multiple seeds in pocket 41 (while insuring the presentation of a single discrete seed to mass 42 via each growth path) and also minimizes the aforementioned damage.

Care must be taken in the assembly of the reaction vessel of this invention. Failures to obtain diamond growth have in many cases been traced to poor cell assembly in which shifting of the wires occurred and they failed to make contact with the contents of pocket 41.

Pressure-transmitting members 36, 37, 38 and 49 are made of material meeting the same criteria as the material for cylinder 33. All of parts 33, 36, 37, 38 and 49 are dried in vacuum for at least 24 hours at 124° C. before assembly. Other combinations of shapes for the pressure-transmitting members may be employed; however, the arrangement shown is preferred.

Each of the following examples are representative of gem quality growth. In each of Examples 1-5, the operating pressure was 57 kilobars; the operating temperature was 1500° C., and the nutrient layer 48 was a mixture of graphite and diamond in a 1:3 ratio (except for the addition of minor amounts of other material in Examples 1, 3 and 4):

EXAMPLE 1

Catalyst—700 mgm (98% iron, 1% aluminum, 1% phosphorus)
Embedment disc 39—0.020" thick, NaCl
Wire—single 0.010" diameter wire of nickel
Diamond pocket 41—25 mgm (75% diamond, 25% graphite)
Time—23 hours
Weight of diamond growth—14 mgm A single clear diamond (nearly water white) with few internal flaws was produced from the wire-induced seeding. The crystal was a truncated octahedron with modifying cube faces.

EXAMPLE 2

Catalyst—700 mgm (97.5% iron and 2.5% aluminum)
Embedment disc 39—0.020" thick, NaCl
Wire—single 0.003" diameter wire of nickel
Diamond pocket 41—25 mgm (75% diamond, 25% graphite)
Time—25.5 hours
Weight of diamond growth—16.6 mgm The single diamond produced from the wire-induced seeding was very pale yellow with only a few minor flaws. This crystal phosphoresced giving off a blue glow under 2537 A light. This diamond was not semi-conducting, had a low nitrogen content and was a truncated octahedron with modifying cube faces.

EXAMPLE 3

Catalyst—700 mgm (92.5% iron, 7.5% aluminum) plus about 10 ppm of boron in the form of $B_4C$
Embedment disc 39—0.020" thick, NaCl
Wires—one 0.005" diameter nickel wire and one 7 mil diameter invar wire
Diamond pocket 41—25 mgm (75% diamond, 25% graphite) plus nickel disc 2 mils × 187 mils in diameter
Time—about 43 hours
Weight of diamond growth—18 mgm (from nickel wire only)

The single diamond crystal resulted from the seeding provided by the nickel wire. Examination disclosed that the invar wire had not properly contacted contents of the diamond pocket 41. The crystal was deep blue, semi-conducting, phosphoresced feebly and was a truncated octahedron with modifying cube faces.

EXAMPLE 4

Catalyst—700 mgm (97% iron, 3% aluminum) plus 5 ppm boron
Embedment disc 39—0.020" thick, NaCl
Wire—single 0.005" diameter nickel wire
Diamond pocket 41—25 mgm (75% diamond, 25% graphite) plus nickel disc 2 mils × 187 mils in diameter
Time—93 hours
Weight of diamond growth—52 mgm The single crystal developed from the wire-induced seeding was pale blue in color, semi-conducting and phosphoresced brightly under 2537 A ultra-violet light. This crystal was a truncated octahdedron with modifying cube faces.

EXAMPLE 5

Catalyst—700 mgm (97% iron, 3% aluminum)
Embedment disc 39—0.020" thick, NaCl
Wires—six 0.005" diameter nickel wires
Diamond pocket 41—a single diamond 2-3 mm seed was used, oriented with octahedral face up in contact with wires
Time—52 hours
Weight of diamond growth—six crystals averaging about 14 mgm Six colorless diamond crystals were produced (one from each wire-induced seeding). The six diamonds grew in parallel crystallographic orientation with an octahedral face up.

In each of the following examples the operating pressure was 55 kilobars; the operating temperature was in the 1450°-1500° C. range and the length of the run was 5 hours. The nutrient layer 48 was a mixture of graphite and diamond in a 1:3 ratio and the catalyst mass was of nickel-iron alloy (51 Ni 49 Fe). In all examples in which wire served as the growth path, nickel wire was used and a disc of Fernico (FeNiCo) alloy (0.002" thick; 0.187" in diameter) was disposed in contact with and between the growth paths and the diamond in seed pocket 41. In some instances requisite contact was not made during loading of the cell and no growth occurred. The seed pocket 41 consisted of 0.025 g of a mixture of diamond and graphite in a 3:1 weight ratio. In all examples crystals grown from the restricted diamond growth paths ranged from about ¾ to 1 mm in size and were clear yellow in color.

EXAMPLE 6

Embedment disc 39—0.028" thick, NaCl
Growth paths—
  one 0.005" diameter wire
  one 0.010" diameter wire one 0.020" diameter wire Diamond growth—a single crystal grew from the two larger wire growth paths; no crystal grew from the 0.005" diameter wire.

EXAMPLE 7

Embedment disc 39—0.023" thick pyrophyllite (alumina-silicate) fired at 750° C.

Growth paths—
one 0.005" diameter wire
one 0.010" diameter wire
one 0.020" diameter wire Diamond growth—each growth path produced a single crystal.

EXAMPLE 8

Embedment disc 39—0.028" thick machinable alumina

Growth paths—
one 0.005" diameter wire
one 0.010" diameter wire
one 0.020" diameter wire Diamond growth—one crystal grew from the 0.005" growth path; no growth from the other growth paths (wires shifted during assembly).

EXAMPLE 9

Embedment disc 39—0.027" thick machinable MgO

Growth paths—
one 0.010" diameter wire
one 0.020" diameter hole

Diamond growth—no crystal developed from the 0.010" diameter wire; a single crystal grew from the hole and several small crystals grew along a crack in the MgO that occurred during loading of the reaction vessel.

The length of the restricted diamond growing path from seed pocket to catalyst-solvent bath is not critical so long as the distance to the diamond pocket 41 from the hot region of the reaction vessel permits a temperature high enough for rendering molten the catalyst-solvent path (e.g. wires 43, 44) where it contacts the diamond seed material. The preferred length is in the 20–40 mils range.

The temperature differential between the hot part of the cell (about half way up the length of the cell) and the diamond pocket is preferably in the range of 20°–30° C. This differential depends upon the construction of the cell e.g. depth of mass of metallic catalyst-solvent, differential resistance in the heater tube, thermal conductivity of the end discs etc.

What we claim as new and desire to secure by Letters Patent of the United States is:

1. In a diamond synthesis reaction vessel for introduction into the reaction volume of a high pressure, high temperature apparatus, said reaction vessel constituting an assembly of interfitting elements for enclosing diamond seed material and a source of substantially pure carbon, said diamond seed material and said source of carbon being separated by a mass of metallic catalyst-solvent material for the diamond-making reaction disposed therebetween so as to provide a pre-determined temperature gradient between said diamond seed material and said source of carbon under operating conditions of pressure and temperature above the graphite-to-diamond equilibrium line on the phase diagram of carbon, said diamond seed material and said source of carbon being located in separate regions of said reaction vessel such that under said operating conditions said diamond seed material will be heated to a temperature near the minimum value of temperature for said temperature gradient and simultaneously said source of carbon will be heated to a temperature near the maximum value of temperature for said temperature gradient, the combination with said interfitting elements of
   (a) a solid barrier separating said diamond seed material from the mass of catalyst-solvent material, said barrier being inert to, and insoluble in, the molten catalyst-solvent material and
   (b) at least one restricted diamond growth path extending through said barrier and interconnecting said mass of catalyst-solvent material and a volume containing said diamond seed material, said growth path having a maximum cross-sectional area equivalent to a circular area having a diameter of 0.020 inches.

2. The combination recited in claim 1 wherein a growth path is in the form of a solid wire of a catalyst-solvent material for the diamond-making reaction.

3. The combination recited in claim 1 wherein a growth path is in the form of a hole through the solid barrier.

4. The combination recited in claim 1 wherein the diamond seed material constitutes a single diamond crystal.

5. The combination recited in claim 1 wherein a plurality of separate growth paths are employed.

6. The combination recited in claim 1 wherein the pressure-transmitting elements of the reaction vessel are made of sodium chloride and the inert barrier is also made of sodium chloride.

7. The combination recited in claim 2 wherein the catalyst-solvent material of which the diamond growth path is made is different from the mass of catalyst-solvent material.

8. The combination of claim 1 wherein the diamond seed material comprises a plurality of diamond crystals.

9. The combination of claim 8 wherein the diamond seed material is a mixture of diamond and graphite.

10. The combination of claim 1 wherein the volume contains the diamond seed material and a concentration of a catalyst-solvent material for the diamond-making reaction.

11. A process for the production of diamond material comprising the steps of: pressurizing a reaction vessel containing a diamond seed material and a source of carbon separated by a mass of catalyst-solvent to a pressure in the diamond stable region of the phase diagram of carbon said seed material, carbon source and catalyst-solvent being positioned in stacked relationship within said reaction vessel; while simultaneously heating said reaction vessel in such a manner to create within said vessel a temperature gradient in said diamond stable region such that the diamond seed material is at a temperature near the minimum temperature of said gradient and said source of carbon is at a temperature near the maximum temperature of said gradient, whereby a temperature gradient is created between said seed material and carbon source; and limiting diamond growth adjacent the diamond seed material until the catalyst-solvent material is saturated with carbon under the operating conditions and until a diamond growth pattern is initiated upon said seed material and established in said carbon saturated mass of catalyst-solvent by interposing an isolation barrier in the reaction vessel between said diamond seed material and said mass of catalyst-solvent prior to said pressurizing and heating step, said isolation barrier being substantially inert to the reaction vessel and its contents at said operating conditions and has at least one opening therein between said diamond seed material and said mass of catalyst-solvent at said operating conditions to define a restricted diamond growth path having an equivalent cross-sectional diameter in the range of 0.001 to 0.020 inches, said diamond growth proceeding freely in said mass of catalyst-solvent, and maintaining said operating conditions until a diamond of at least 14 mgm is grown.

12. A process as defined in claim 11 wherein disposed in said opening is a solid wire of a catalyst-solvent material for the diamond-making reaction.

13. In a process for the production of diamond material comprising the steps of:
 (i) providing a reaction vessel containing a diamond seed material and a source of carbon separated by a mass of catalyst-solvent for the diamond making process;
 (ii) providing means for applying high temperature and high pressure to said reaction vessel;
 (iii) inserting said reaction vessel in said means for applying high temperature and high pressure; and
 (iv) subjecting said reaction vessel to operating conditions of temperature and pressure in the diamond stable region of the phase diagram for carbon to create a predetermined temperature gradient in said reaction vessel in a manner such that said diamond seed material is at a temperature near the minimum value of temperature for the temperature gradient at substantially the same time said source of carbon is at a temperature near the maximum value of temperature for said temperature gradient;
the improvement in said process comprising the step of interposing in the reaction vessel between said diamond seed material and said mass of catalyst-solvent before the reaction vessel is inserted in said means for applying high temperature and high pressure, a layer substantially inert to and insoluble in the molten catalyst-solvent at said operating conditions and having at least one opening in said layer between said diamond seed material and said mass of catalyst-solvent at said operating conditions to provide a restricted diamond growth path and provide a discrete seeding site to the mass of catalyst-solvent remote from said seed material and disposing in said opening a solid wire of a catalyst-solvent material for the diamond-making reaction.

14. Apparatus for the production of diamond materials comprising: a reaction vessel containing a diamond seed material and a source of carbon separated by a mass of catalyst-solvent, said seed material, carbon source and catalyst-solvent being arranged in stacked relationship within said vessel; means for pressurizing said vessel to a pressure in the diamond stable region of the phase diagram for carbon; means for heating said vessel, contemporaneously with pressurization, in such a manner to create a temperature gradient in said diamond stable region within said vessel such that the diamond seed material is at a temperature near the minimum of said gradient and said source of carbon is at a temperature near the maximum temperature of said gradient, whereby a temperature gradient is created between said seed material and carbon source; and a solid barrier layer defining a restricted growth path opening having a solid wire of a catalyst-solvent material for the diamond-making process disposed therein and interconnecting said mass of catalyst-solvent and a volume containing said diamond seed material, said layer being selected from the group consisting of NaCl, CaF$_2$, refractory oxides, natural mica, high melting point silicate glasses not reduced by hot carbon, and porcelain, said layer limiting diamond growth adjacent the diamond seed material until the catalyst-solvent material is saturated with carbon, under the operating conditions of the diamond-making process and until a diamond growth pattern has developed from said seed material to said carbon saturated mass of catalyst-solvent, such as to control the size of the diamond growth presented thereto said diamond growth proceeding freely in said mass of catalyst-solvent, whereby a diamond of at least 14 mgm is grown.

15. An apparatus as defined in claim 14 wherein said diamond seed material is a single crystal.

16. In an apparatus for the production of diamond material comprising:
 (i) a reaction vessel containing a diamond seed material and a source of carbon separated by a mass of catalyst-solvent for the diamond-making process;
 (ii) means for heating said vessel to a temperature in the diamond stable region of the phase diagram for carbon and to create a predetermined temperature gradient in said reaction vessel such that said diamond seed material can be maintained at a temperature near the minimum value of temperature for the temperature gradient at substantially the same time said source of carbon is at a temperature near the maximum value of temperature for said temperature gradient; and
 (iii) means for applying high pressure for operating said reaction vessel in the diamond stable region of the phase diagram for carbon;
the improvement comprising:
 (iv) a layer in said reaction vessel interposed between said diamond seed material and said mass of catalyst-solvent, said layer being a solid barrier being substantially inert to and insoluble in the molten catalyst-solvent, and defining a restricted diamond growth path between said seed material and mass of catalyst-solvent such as to provide a discrete seeding site to the mass of catalyst-solvent remote from said seed material, said restricted growth path having disposed therin a solid wire of a catalyst-solvent material for the diamond-making process.

17. An apparatus as defined in claim 16 wherein said layer has a thickness in the range of from about 0.010 to 0.030 inches.

18. An apparatus as defined in claim 17 wherein said growth path is in the range of 20 to 40 mils in length.

* * * * *